Sept. 8, 1931.                H. TRÉPADÉ                1,822,831
              UTILIZING HYGROSCOPIC PRODUCTS WITH BROOMS
                         Filed Dec. 26, 1928
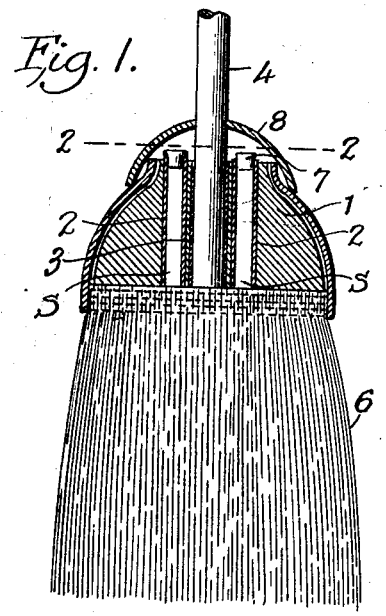
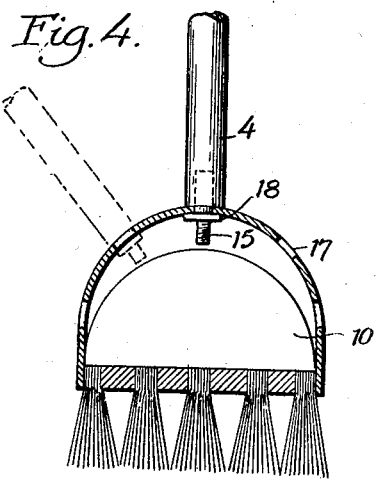
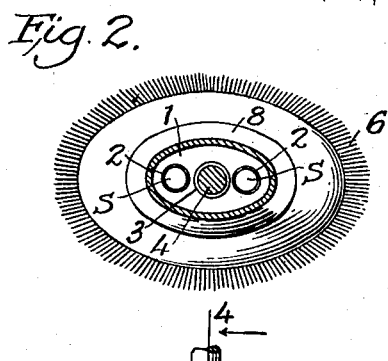
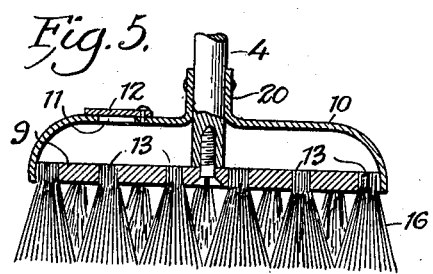
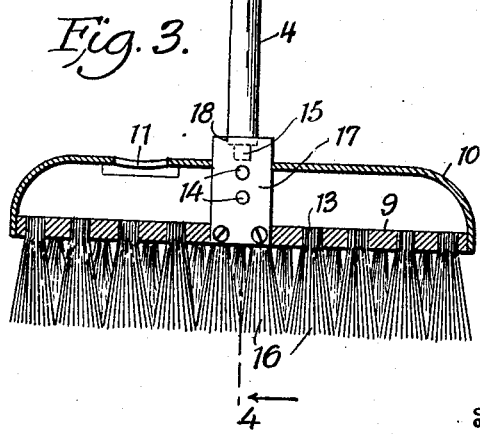
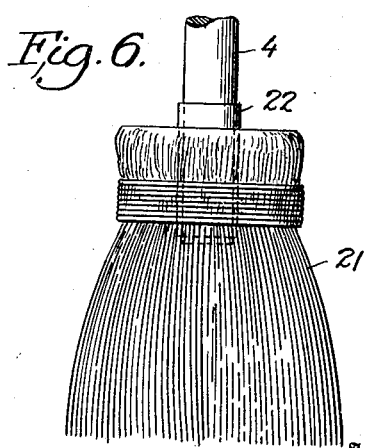

Patented Sept. 8, 1931

1,822,831

UNITED STATES PATENT OFFICE

HENRI TRÉPADÉ, OF PARIS, FRANCE

UTILIZING HYGROSCOPIC PRODUCTS WITH BROOMS

Application filed December 26, 1928, Serial No. 328,583, and in France December 30, 1927.

This invention relates to brooms and dust absorbing agents for use therewith. More particularly, it relates to brooms of the kind which are provided with a receptacle or receptacles in the head of the broom for storage of dust absorbing agents which are fed therefrom to the bristles; and the invention consists in applying to such brooms whether made of straw, vegetable or animal fibre, or twisted cotton fringes, a hygroscopic substance in solid form for the purpose of supplying moisture to the bristles to absorb or coagulate the dust and thus prevent same from rising when sweeping.

I will explain the invention with reference to the accompanying drawings which illustrate several practical embodiments thereof to enable others to adopt and use the same, and will summarize in the claims the essential features for which protection is desired.

In said drawings:—

Fig. 1 is a sectional elevation of one form of broom head.

Fig. 2 is a horizontal section on the line 2—2, Fig. 1.

Fig. 3 is a sectional elevation through a modified form of broom head.

Fig. 4 is a section on the line 4—4, Fig. 3.

Fig. 5 is a sectional elevation of still another modification.

Fig. 6 is a sectional elevation of still another modification.

For the straw broom, Figs. 1 and 2, I make, while constructing same, three holes in the body 1 of the broom, using metal sheaths 2. The central hole 3 which is made by the mandrel of the machine used to make the broom, is adapted to receive the handle 4, while the other two holes 5 are used as reservoirs.

In the reservoirs 5 are placed hygroscopic products, such as chlorides of earthy metals, i. e., calcium chloride or magnesium chloride, or any other solid hygroscopic products, used separately or mixed. Plugs 7 may be used to close the tops of reservoirs 5. In becoming liquid said products humidify the straw which agglutinates the dust. In the course of liquefaction, the solid hygroscopic substances serve to supply sufficient moisture to the bristles to absorb or coagulate the dust, and this method of supplying the moisture obviates the necessity of employing liquid tight reservoirs in the brooms with means for controlling the supply of liquid therefrom to the straws or bristles, also obviating the necessity of using fabrics for conducting the liquid from the reservoirs to the bristles, although if desired strips of vegetable fibre woven or otherwise may be incorporated in the broom for the purpose of assisting in moistening the bristles. The top of the broom stock 1 may be covered with a metal or like cap 8. The straws 6 may be fastened to the body 1 by stitching or otherwise, and the lower ends of the reservoirs 5 open into the upper ends of the straws 6 adjacent the line of stitching.

For the broom of vegetable and animal fibers, used separately or mixed, shown in Fig. 3, the upper end of the wooden stock 9 holding the fibers 16, is provided with a cover 10 having an opening 11 through which the solid hygroscopic products are introduced; a sliding closure 12 is adapted to close said hole. Openings 13 are formed in the stock 9 communicating directly with the bristles 16.

Bridging the cover of the broom is a bowed metallic band 17 pierced with a groove or holes 14 through which passes a threaded rod 15 fixed to the handle 4, and a screw 18 attached to the metal band 17 by a metal ring sliding the whole length of the band will hold tightly the handle 4 to the band 17 in any adjusted position.

To fix the handle 4 to the broom it will only be needed to put the holes of the ring, the metal band 17 and the screw 18 one on top of the other and to pass the threaded rod 15 through same. The metal band 17 clamped tightly between the handle 4 and the screw 18 will fasten the handle 4 to the broom. The handle can also be fixed directly to the broom through a flanged opening 20 in the center of the cover 10 as shown in Fig. 5.

The fibers can thus be humidified without reservoirs to give the brooms a better appearance and better use.

For brooms of cotton as shown in Fig. 6, a fringe 21 is wrapped tightly round a metal frame 22 of symmetrical shape attached to a handle 4. The frame 22 can also be made of a metal band or of wood. The fringe is then moistened with a liquified hygroscopic product.

The advantage of using my brooms, is that same are essentially hygienic by allowing sweeping without raising dust; also they give longer use than dry brooms.

The hygroscopic products can also be mixed with granulated products to be used for sweeping without raising dust, and if desired disinfectants may be readily incorporated.

I claim:

1. In a broom or the like, a perforated reservoir; and a solid hygroscopic product consisting of calcium chloride in the reservoir adapted to slowly liquefy by absorbing humidity from the air whereby the broom will be maintained moist.

2. In a broom or the like; a perforated reservoir; and solid hygroscopic products in the reservoir adapted to liquefy slowly by absorption of humidity from the air and thereby moisten the broom.

3. In a broom or the like; a perforated reservoir; a solid hygroscopic product consisting of a chloride of an earthy metal in the reservoir adapted to liquefy slowly by absorption of humidity from the air and thereby moisten the broom.

4. The method of applying moisture to the bristles of brooms which consists in placing a solid hygroscopic substance adapted to slowly liquefy by absorption of humidity from the air, in contact with the upper ends of the bristles, the bristles absorbing the moisture produced by the gradual liquefaction of the solid substance.

HENRI TRÉPADÉ.